March 16, 1926. Re. 16,294
S. A. XIPPAS
ELECTRIC FAN
Original Filed August 14, 1924 2 Sheets-Sheet 1
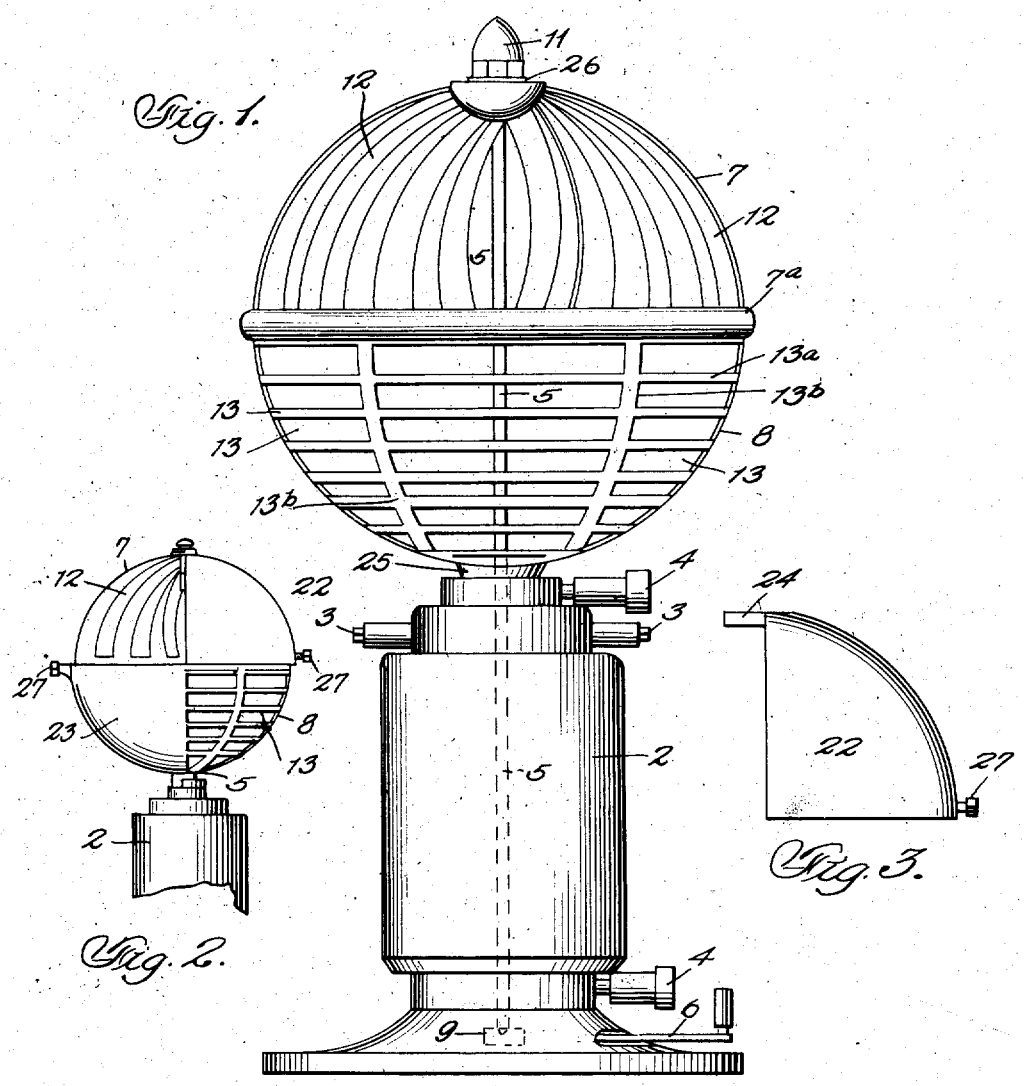
Inventor
Socrates A. Xippas
By Ralph T. Barrett
Attorney
PHOTO-LITHO by SACKETT & WILHELMS CORP. N.Y.

March 16, 1926. Re. 16,294

S. A. XIPPAS

ELECTRIC FAN

Original Filed August 14, 1924 2 Sheets-Sheet 2

Inventor

Socrates A. Xippas

By Ralph V. Barnett

Attorney

Reissued Mar. 16 1926.

Re. 16,294

UNITED STATES PATENT OFFICE.

SOCRATES A. XIPPAS, OF PITTSBURGH, PENNSYLVANIA.

ELECTRIC FAN.

Original No. 1,560,961, dated November 10, 1925, Serial No. 731,991, filed August 14, 1924. Application for reissue filed November 25, 1925. Serial No. 71,453.

*To all whom it may concern:*

Be it known that I, SOCRATES A. XIPPAS, a citizen of the United States, residing at Pittsburgh, in the county of Allegheny and State of Pennsylvania, have invented certain new and useful Improvements in Electric Fans, of which the following is a specification.

My invention relates to electric fans.

The object of the invention is to provide a device which will produce a large amount of air blast and to have no visible moving parts which renders the fan absolutely safe against accidents.

A further object of the invention is to provide a device which will cause a continuous flow of air in all directions and to take the place of the ordinary "buzz" oscillating fans and their crude and intricate mechanism as in my invention there are only two bearings and no interior working parts liable to get out of order.

A further object of the invention is to provide means whereby the blast may be regulated so as to blow in any one or more directions, when it is not desired to have the fan discharge in all possible directions, which directions are included in a horizontal zone surrounding the central portion of the fan.

Further objects and advantages will be more fully described herein and specifically pointed out in the claims hereunto annexed, recourse being had to the accompanying drawings forming a part of this specification in which:—

Figure 1 is a view of the complete fan;

Figure 2 is a view of the upper portion of the fan showing the blast regulating or cut off plates on the perforated casing or sphere;

Figure 3 is a perspective view of one of the blast shut off or cut out plates.

In the drawings like reference numerals indicate similar parts in all the several views:—

Figure 4:
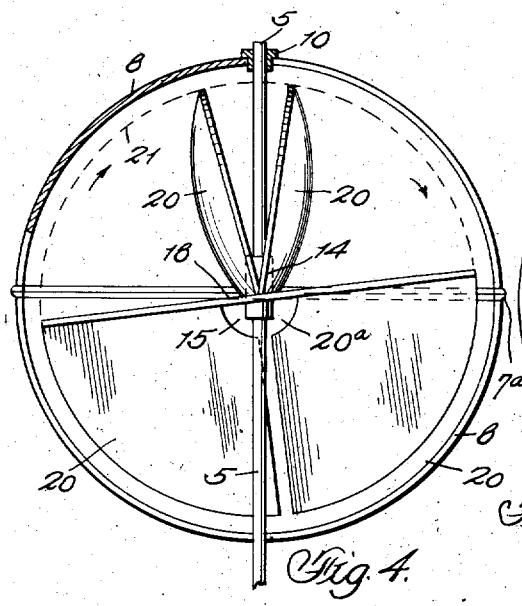
Figure 4 is an edge view of the obliquely or angularly disposed rotary disc showing two depending blades or wings in side elevation.

Referring to Figure 1, 1 is the base or stand of the apparatus arranged in the ordinary manner.

2 is a vertical motor adapted to have a vertical shaft, also, and to drive the hereinafter described rotor with its wings or impellers.

3 are the brush terminals of the motor and are adapted to be attached to wires leading to an electric supply.

4 are the lubricating oil cups, and 5 is the vertical motor shaft before mentioned.

6 is a switch, Figure 1, for regulating the speed of the motor in the usual manner.

Mounted on the upper end of the motor 2 is a spherical openwork cage or shell entirely enclosing the hereinafter described wing or impeller mechanism which constitutes the blast making fan or rotor, and is in two parts, the upper 7 and the lower portion 8 suitably united as at $7^a$, in Figure 1.

The shaft 5 passes through the sphere or globe 7—8, its lower end being suitably mounted for rotation in the step bearing 9, dotted lines, the upper end of the shaft rotates in the bearing 10 in the top portion 7 of the cage or spherical shell.

11 is an ornament, said ornament also forming points of attachment for the hereinafter described shut off plates.

In order to permit the air to be admitted into and discharged from the globe shaped cage or shell, it is provided with cut out portions 12 which extend from the top to the medial plane of the globe and increase in width as they approach the medial plane.

It will be seen that the cut out portions extend over the globe in such an arrangement that the air is permitted to pass freely into and be discharged from the entire surface of the globe.

13 are cut out portions or blast orifices formed by the belt or horizontal bars 13[a] and the vertical staggered bridge bars 13[b], thus forming elongated or rectangular air entrance and exit passages.

As shown in Figure 1, two kinds of cut out portions are placed on the sphere or globe but the entire surface of the ball-like cage may be provided with cut out portions of only one style, that is, either the arcuate spaces 12 or the girth or horizontal slots 13.

Upon the shaft 5 at or near the central portion of the cage, globe or sphere 7—8, is placed a sleeve or collar 14 having an angular or bevelled portion 16.

15 is a similar sleeve or collar having a bevelled end 16 corresponding to the bevel of the sleeve 14.

Both sleeves are secured to the shaft 5 by the set screws 17 and are adapted to be separated a short distance so as to form a space for the clamping of the center 18 of the ring or annulus 19. Therefore, when said center 18 of the ring or gyrator 19 is firmly clamped by the parts 14 and 15 forming a collar, the ring is held at an angle, (Figures 4 and 6), or in an oblique position, as shown. In order to form the ring 19, a disc of metal is cut so as to form a series of blades, wings or impellers, usually four, and to accomplish this, the circular disc is cut into four parts which are bent upwards and downwards to form the blades 20.

Figure 5:
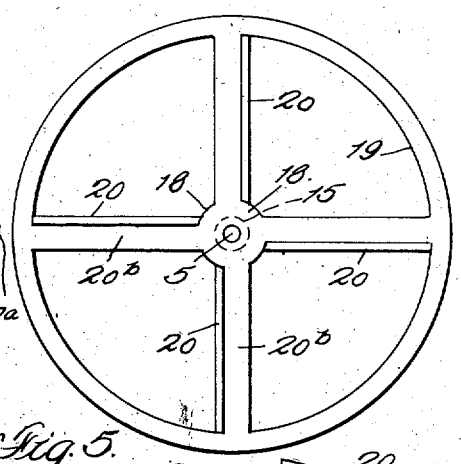
Figure 5 is a plan of the obliquely mounted ring showing an edge view of the wings or blades.
Figure 7:
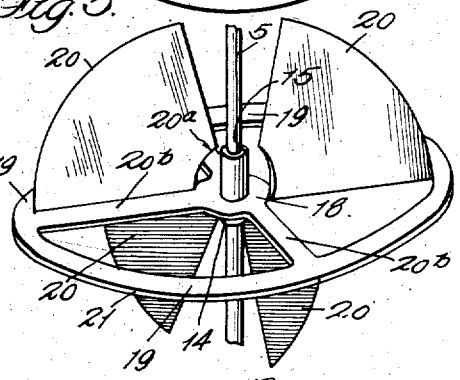
Figure 7 is a perspective view of the oblique annulus or ring with its wings or impellers.
Figure 9:
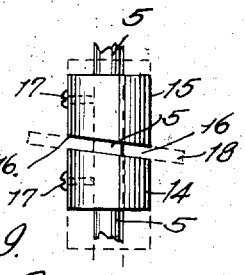
Figure 9 is an elevation of a portion of the vertical shaft showing the two part hub or center of the rotary wing mechanism or rotor and the bevel or angular ends of the same.
Figure 8:
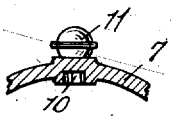
Figure 8 is a fragmentary cross section of a part of the upper section of the spherical fan cage showing the bearing for the upper portion of the rotary vertical shaft.

The cut out segments above mentioned are smaller than the actual segments capable of being cut from the circular disc thus producing the spokes or arms 20[b], Figures 5 and 7.

Two of the blades are bent upwards and two bent downwards, as shown, and the blades are preferably made to assume slight angles to each other.

Figure 6:
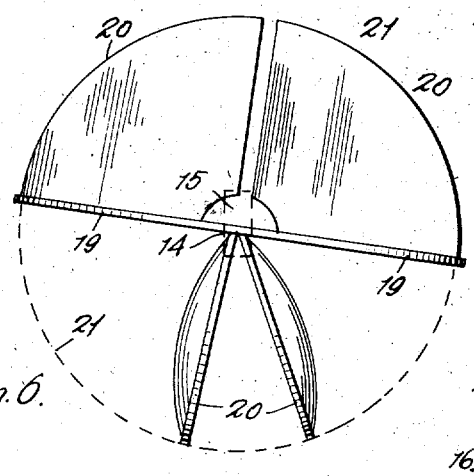
Figure 6 is the same as Figure 4 but showing two wings or blades in side elevation above the ring or oblique disc.

Referring to Figures 4 and 6, it will be seen that the outer peripheries 21, shown by dotted lines, of the upper wings or blades 20 form a circle as do the lower blades or wings, Figure 4, therefore they form a portion of two discs intersecting each other at right angles.

The manner of operation involving the oblique or wabble motion of the ring 19 and its blades or wings 20 is, that by the peculiar motion of the rotating parts, the air is forced upwards upon the rising of the ring to its highest position and forced downwards by the lower blades and the alternate and rapid reversals of motion forces a large quantity of air in all directions.

In this invention there is more blast for less blade area as the air is slightly compressed or retarded and then discharged there being no ineffective or dead surfaces as is common in fans of the propeller disc variety.

I may dispense with the angular positioning of the fan or blast element and place it at right angles to the axis of rotation.

In order to provide means whereby the blast may be directed or restricted to a certain direction I provide shutters or cut off plates 22 and 23 conforming in shape to one eighth, more or less, of the surface of the sphere or globe enclosure 7—8, Figures 2 and 3. The plates are provided with rings 24 at their upper or lower portions, the eye or hole of which is adapted to be inserted over the boss 25 and the portion 26, Figure 1.

In this manner the plates 22 and 23 can be rotated entirely around all portions of the sphere 7—8, so that a certain number of the cut out portions 12 and 13 can be closed or cut off and the blast of air directed at a given point or points at will.

The plates for convenience, are provided with knobs 27 for facilitating the movement thereof.

In the fan described, the motor by which the before-mentioned wings or blades are driven, is vertical so that it is not necessary for the motor to assume any angular position as is done in the ordinary disc or "buzz" fan and which is effective only in small areas. The uses of my invention are more varied than the ordinary propeller fan and is better suited for commercial uses besides being absolutely safe where there are children as there is no danger of severed or injured fingers.

For drying ladies' hair after shampooing, the fan can be held close to or against the head without inconvenience or danger and have the blast to blow in all directions.

At dining tables, lunch counters and other places, the blast is directed to each person alike and eliminates flies for a large area around said tables or counters.

By admitting air into the cage at the upper and lower portions and discharging it medially thereof, it will be seen that the heated air near the ceiling and the cold air near the floor will be drawn into circulation and will be commingled so as to provide an evenly heated room at a moderate temperature.

The amount of electric current required to operate my device is less than that required for the ordinary type of fan to produce a greater amount of effective blast.

Having thus described my invention, what I claim and desire to secure by Letters Patent is:

1. An electric fan or blower, comprising a motor shaft, and a disc mounted axially and obliquely thereon for rotation having wings or impellers, bent at right angles to each other.

2. An electric fan, a motor shaft, and a circular disc axially mounted for rotation thereon and affixed thereupon at an angle, said disc provided with wings or blades at right angles thereto.

3. An electric fan, a motor shaft, and an inclined horizontally positioned circular disc adapted to oscillate during a revolution, and blades or wings at right angles thereto.

4. An electric fan, a rotary shaft, a circular disc horizontally mounted thereon and adapted to have a wabbling motion, and inclined wings or blades stamped from said disc.

5. An electric fan, a motor shaft, a rotary disc mounted thereupon, said disc having sets of blades or blast wings formed thereupon oppositely disposed from each other and stamped from the disc to form an annulus or ring and radial bars or spokes for supporting said blades.

6. An electric fan, a motor shaft, an obliquely mounted circular disc adapted to have a wabbling motion imparted to it by said shaft and having wings or blades bent upwards and downwards formed from said disc and a connecting ring at the outer periphery of the blades and forming part thereof.

7. An electric fan, a motor shaft, a disc disposed upon the shaft having kerfs cut to form segmental wings or blades when bent upward and downward, said wings being oppositely disposed and forming a supporting ring formed with said wings and connecting the same at their peripheries.

8. An electric fan, comprising a circular disc having oppositiely disposed impellers or blast producers and a supporting annulus cut and bent from said disc and mounted within a spherical cage or shell provided with blast orifices and completely enclosing said blast means.

9. An electric fan or air distributor, comprising a wind blast creating winged circular disc and its inherent annulus or ring arranged for rotary motion, an enclosure therefor having the form of a hollow ball or sphere, said sphere being provided with orifices for the entrance and exit of the air blast and covering the entire surface of said spherical enclosure.

10. An electric fan, comprising a series of circular conforming blast sectors at right angles to each other and formed from a circular disc, and a two part cage or globular confining means therefor provided with blast outlets in its surface for forcing the air in multiple channels and in various directions.

11. An electric fan, comprising a rotary angularly mounted blast wheel or impeller formed of a single circular disc, a spherical cage or enclosure surrounding said wheel or rotor, said cage provided with blast outlets or orifices for directing the blast in various directions.

12. An electric fan, comprising a rotary blast device, a perforated spherical cage or shell for confining the same, and a slidable plate or plates thereon conforming to the shape of the surface of said shell for opening and closing any number of said perforations at will to direct the blast in any particular direction.

13. An electric fan, comprising a rotary blast wheel formed from a circular disc, a perforated spherical or globe shaped enclosure therefor, and circumferential plates adapted to be moved to cover and uncover any portion of the perforated surface of said spherical enclosure.

14. In an electric fan, a shaft, a disc thereon, upper wings on said disc disposed at an angle to each other, lower wings on said disc disposed at an angle to each other, all of said wings being of similar formation, an openwork enclosing casing for said disc and wings, and means for rotating said shaft.

15. An electric fan or blower, comprising a motor shaft, a disc mounted thereon for rotation therewith, said disc being provided with a plurality of sets of independent wings or impellers oppositely disposed on said disc, said sets being disposed at substantially right angles to each other.

16. An electric fan or blower, comprising a motor shaft, a disc mounted thereon for rotation therewith, said disc being provided with a plurality of sets of independent wings or impellers, said sets being disposed at substantially right angles to each other, the wings or impellers of each set being at an angle to each other.

In testimony whereof I affix my signature.

SOCRATES A. XIPPAS.